United States Patent [19]

Gazzoni

[11] 4,441,262

[45] Apr. 10, 1984

[54] DRIER, PARTICULARLY FOR PLASTIC MATERIAL

[75] Inventor: Domenico Gazzoni, Breccia, Italy

[73] Assignee: Sorema s.r.l., Italy

[21] Appl. No.: 330,852

[22] Filed: Dec. 15, 1981

[30] Foreign Application Priority Data

Mar. 17, 1981 [IT] Italy .................. 20371 A/81

[51] Int. Cl.³ ............................................ F26B 17/10
[52] U.S. Cl. .............................. 34/57 D; 34/57 E; 34/58; 210/414
[58] Field of Search ............. 210/405, 407, 413, 414, 210/415; 494/36; 34/8, 58, 57 D, 57 E

[56] References Cited

U.S. PATENT DOCUMENTS 3,305,940 2/1967 Isler .................................. 34/57
4,081,382 3/1978 Buzga .............................. 34/57 E Primary Examiner—Larry I. Schwartz
Attorney, Agent, or Firm—Stevens, Davis, Miller & Mosher

[57] ABSTRACT

A rotor receives the wet material to be dried and centrifugates it outwards with conveyance air created by the same rotor. Around the rotor there develops a first scroll, which receives and conveys towards an outlet the material centrifugated by the rotor and said conveyance air. The lateral wall of said first scroll is provided with a bored grating, against which there hits the centrifugated material, which thus looses a part of the liquid that accompanies it; another part is removed by the same conveyance air, which filters partially through the grating into a second scroll that conveys it to discharge with the liquid separated and passed through the grating.

4 Claims, 2 Drawing Figures

DRIER, PARTICULARLY FOR PLASTIC MATERIAL

The present invention relates to a drier, particularly for plastic material, which is fitted to the treatment of very light material with flat and irregular shape.

The systems known until now for drying plastic materials, normally in the shape of granules having stocking density not lower than 500÷600 gr/l according to the geometric shape, which mainly come from manufacturing processes in contact with liquids (coolings, washings, separations), operate through an air flow coming from a centrifugal fan. This flow has the purpose of giving the material, which is normally introduced into the drying duct by a Venturi system, a considerable conveyance speed. In the duct there are provided suitable bends provided with bored gratings, which, receiving the impact of the material, give rise to a loss of liquid, which is taken away by a secondary air flow represented by that part of conveyance air which passes through the above mentioned gratings. This operation is then repeated many times to obtain a good drying.

Such known systems operate with success only because, as already said, the materials to be dried have normally a considerable stocking density as well as regular shape with diameter or side of about 3.5÷4 mm and therefore a relatively big mass.

On the contrary, they would not result efficient with plastic materials much more light and with flat and irregular shape, such those that the increasing diffusion of plastic materials makes very often obtainable from recovery operations of waste materials. In such a case the material to be dried is in fact constituted by irregular and thin leaves with maximum surface of 1.5 cm$^2$ and therefore with single-size mass and stocking density 15÷20 times lower than those of the materials worked until now. As a result, the effect of the impact of the material against the gratings of the bends of the drying duct of the systems known until now would be minimum, also considering the conveyance speeds obtainable at the present time, and the light weight of the single pieces of material, while at the same time, as the superficial size of the same pieces and therefore their wettable surfaces are greater, the quantity of liquid to be removed would be correspondingly greater.

The object of the present invention is thus to realize a drier which is able to operate efficiently also on very light materials with flat and irregular shape, such as the above mentioned thin leaves.

According to the invention such an object has been attained by a drier characterized in that it comprises a rotor, able to receive from above the wet material to be dried and to centrifugate it outwards together with conveyance air generated by the same rotor, a first scroll which develops around said rotor to receive and convey towards an outlet said material and said conveyance air, a bored grating arranged in a lateral wall portion of said first scroll in such a position as to receive the impact of the material centrifugated by the rotor and to allow the outflow of a part of said conveyance air and of the liquid which separates from the material because of said impact and the crossing of the material by said conveyance air, and a second scroll which develops around said portion of the first one to receive and convey towards a discharge said conveyance air and said liquid passed through the grating.

In other words, the drier according to the invention is based on the fact that the rotation of the rotor, with a speed selectable at will and anyway fixable at a high value, exerts on the wet material a composite action, which is in part mechanical and in part by air flow: the mechanical action is created by the centrifugal force and consists in a strong beating of the material against the bored grating of the first scroll, where the material yields a great part of the liquid that wets it and comes out through the same grating; the action by air flow is in its turn due to the conveyance air flow produced by the rotor and consists in a further removal of liquid by crossing of the material and in the conveyance of the same material towards the drier outlet. The liquid separated in any way from the material and filtered through the grating is in its turn conveyed to discharge by that part of conveyance air which flows through the grating into the second scroll, possibly with the help of a suitable inclination of the bottom wall of the latter.

With a suitable choice of the rotation speed of the rotor, as well as of its diameter and the number of the blades, it is thus made possible to exert also on a very light, thin and with wide wet surface material a sufficient action to allow its good drying and its effective conveyance towards the drier outlet (or towards analogous stages or, in alternative, stages of conventional type with bend with bored grating).

Certainly this could not be obtained with the traditional driers with an air flow originated by a "Venturi", due to their speed limits with respect to the rotator system according to the invention.

The feature of the present invention will be better understood after an examination of the following detailed description of an embodiment illustrated by way of example in the accompanied drawings, in which.

Figure 1:
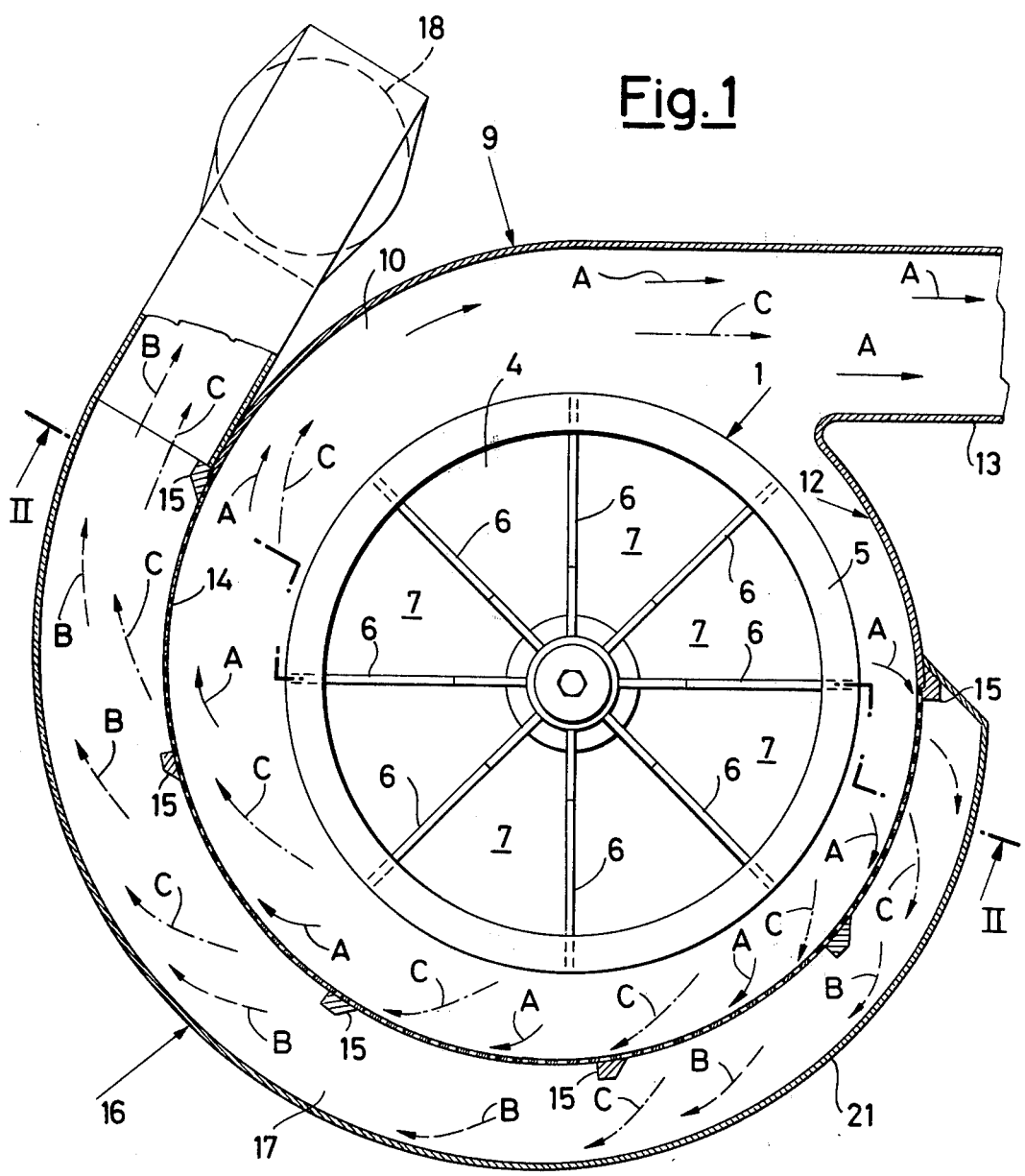
FIG. 1 shows a drier according to the invention in horizontal section along line I—I of FIG. 2.
Figure 2:
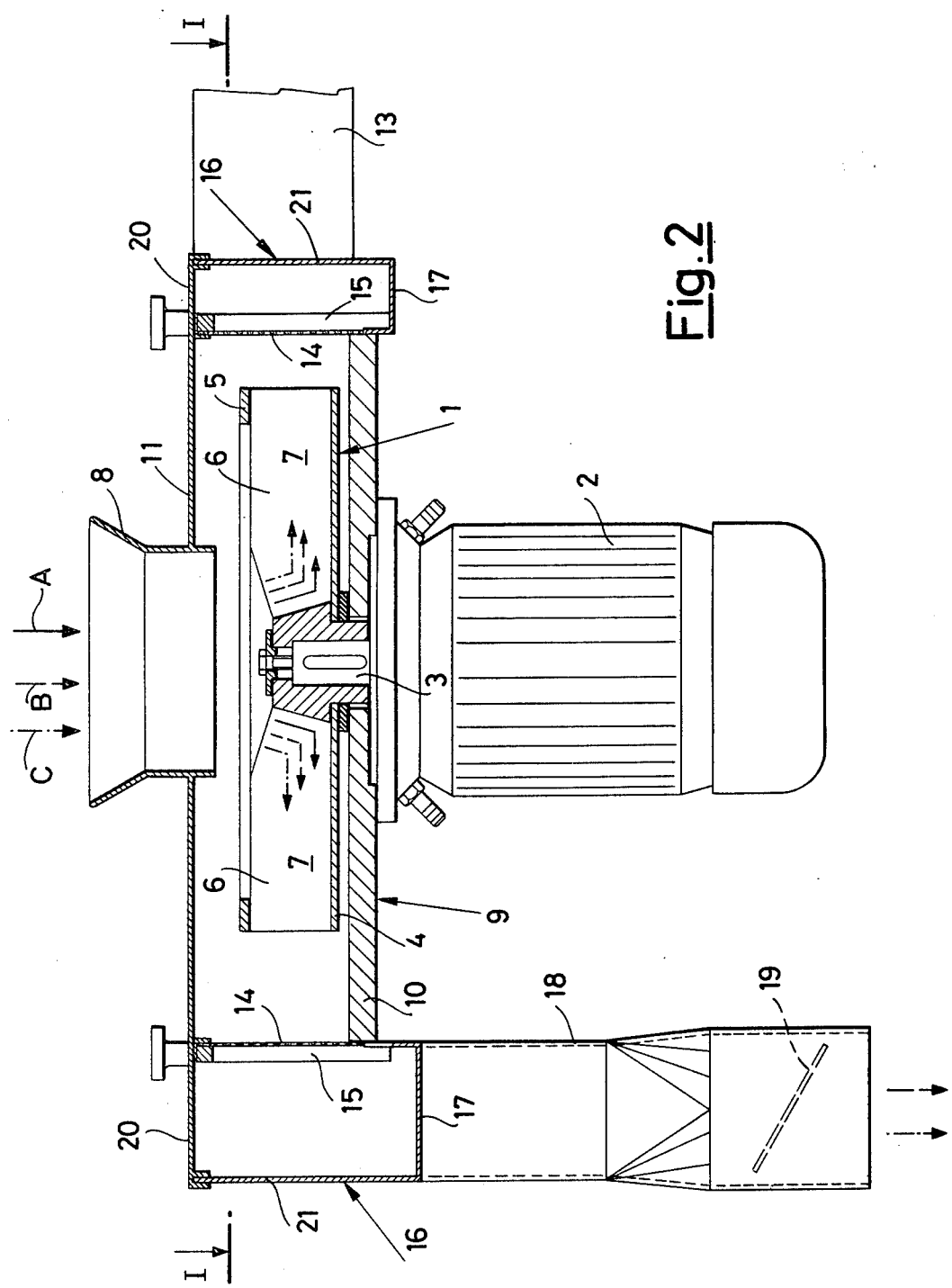
FIG. 2 shows a drier according to the invention in vertical section along line II—II of FIG. 1.

The drier shown in the drawings comprises a vertical axis rotor 1, which is rotated in clockwise rotation (looking at FIG. 1) by a driving motor 2, to whose shaft 3 the rotor is rigidly fixed.

The rotor 1 comprises an inferior base plate 4, a superior ring 5 and a plurality of radial vertical walls or "blades" 6, which define a correspondent plurality of radial ducts 7, which are upwardly and outwardly open so as to receive from above the wet material (through a loading mouth 8) and, because of the rotor rotation, to centrifugate it out of the same rotor together with conveyance air drawn by negative pressure through the same loading mouth.

Around the rotor there develops a first scroll 9, formed by a base wall 10, by a covering wall 11, passed through by the loading mouth 8, and by a progressively flared lateral wall 12, which leads towards an outlet 13. A portion of said lateral wall, with a compass greater than 180°, includes a bored grating 14 provided with external reinforcements constituted by vertical leveled columns 15 suitably spaced with respect to each other.

Around the first scroll 9 there develops, in its turn, a second scroll 16, formed by a bottom wall 17 slightly inclined towards a discharge pipe 18 provided with a throttle check valve 19, by an external annular extension 20 of the covering wall 11 of the scroll 9, by an internal lateral wall represented by the bored grating 14 and by an external progressively flared lateral wall 21, which leads towards the above mentioned discharge pipe.

From the above mentioned structure there results the following mode of operation, that in the drawings is made evident by a group of suitably directed arrows, of which those in continuous line A indicate the path of the material, those in dash B the path of the liquid, that firstly accompanies the material and then separes therefrom, and those in dash and dot C the path of the air.

Through the loading mouth 8 there is fed the wet material to be dried (therefore, material plus liquid, as illustrated by the arrows A and B) and, by the effect of the rotor rotation (suitably closen according to the material weight) there is also intaken air destined to the conveyance of the material and of the same liquid when separated.

The material penetrates from above into the several radial ducts 7 of the rotor 1, where the vertical walls 6, acting as fan "blades", centrifugate material and air, beating violently the first one against the bored grating 14 and creating for the second one a conveyance air flow which, following the development of the scroll 9, provides for the conveyance of the material towards the outlet 13.

The impact of the material against the grating 14 causes the separation of a great part of the liquid from the same material, while another part is extracted by the same conveyance air, which crosses the material and in part comes out from the scroll 9 through the bores of the grating 14, as well as the separated liquid does.

The above mentioned come-out air provides in its turn for the liquid conveyance along the scroll 16 and towards the dischaarge pipe 18, helped in this action by the slope of the bottom wall 17 and by the progressive flaring of the external lateral wall 21. The discharge flow is regulated by the throttle-valve 19, so as to secure in the inner of the scroll 9 sufficient air pressure to convey the material towards the outlet 13.

It is evident that the double mechanical and pneumatic action exerted on the wet material as a result of the beating against the grating 14 and the crossing of the material by the air flow produced by the rotor allows the drier to remove from the material the most part of the liquid that accompanies it, either the material is formed by regular granules having high stocking density or it is formed by thin leaves with irregular shape and at a low stocking density. However, if this is not sufficient, it can be provided to connect the outlet 13 of the drier illustrated in the drawings to other analogous stages or to conventional bends with bored gratings, where during the conveyance the material can lose further liquid.

I claim:

1. Drier, particularly for plastic material, comprising a rotor rotating about a vertical axis means for directing wet material to be dried onto the rotor from above and means for rotating said rotor so as to centrifuge said material outwardly together with conveyance air generated by the rotor, a first scroll around said rotor to receive and convey towards an outlet said material and said conveyance air, a bored grating arranged in a lateral wall portion of said first scroll in such a position as to receive the impact of the material centrifugated by the rotor and to allow the outflow of a part of said conveyance air and of the liquid which separates from said material because of said impact and the crossing of the material by said conveyance air, and a second scroll which develops around said portion of the first one to receive and convey towards a discharge said conveyance air and said liquid passed through the grating.

2. Drier according to claim 1, characterized in that said second scroll includes a bottom wall inclined towards the discharge.

3. Drier according to claim 1, characterized in that said second scroll ends in a discharge pipe provided with check-valve.

4. Drier according to claim 1, characterized in that said rotor provides a plurality of radial ducts, which are loaded centrally and open towards the outside.

* * * * *